Sept. 1, 1953

L. B. NEMMER ET AL 2,650,767

VALVE FOR LUBRICANT TEMPERATURE
REGULATING SYSTEMS

Filed June 6, 1941

Inventors
Leo B. Nemmer &
Charles J. O'Brien

By
Blackmore, Spencer & Flint
Attorneys

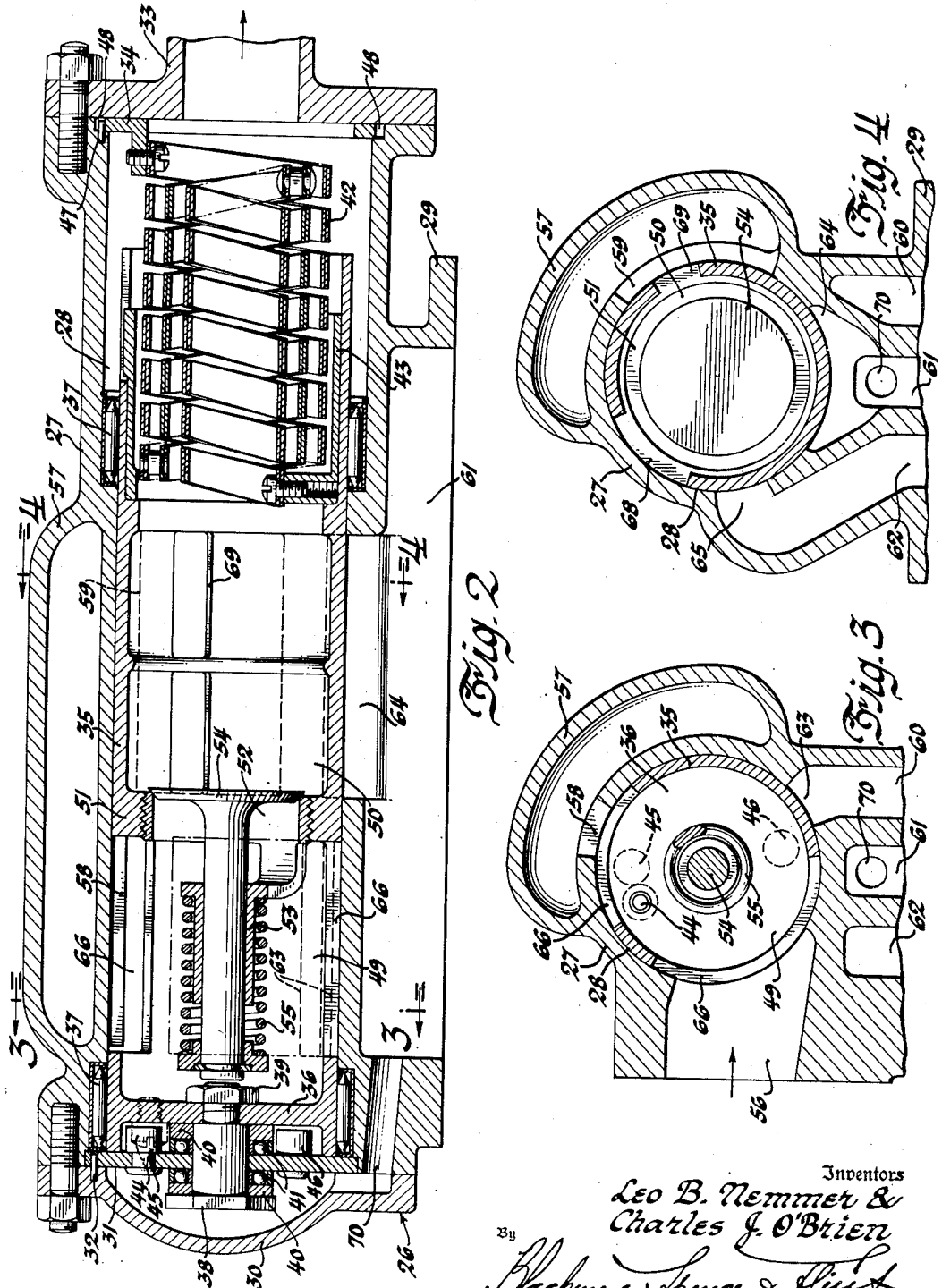

Patented Sept. 1, 1953

2,650,767

UNITED STATES PATENT OFFICE 2,650,767

VALVE FOR LUBRICANT TEMPERATURE REGULATING SYSTEMS

Leo B. Nemmer, Glendale, Calif., and Charles J. O'Brien, Lockport, N. Y., assignors to General Motors Corporation, Detroit, Mich., a corporation of Delaware Application June 6, 1941, Serial No. 396,830

8 Claims. (Cl. 236—34.5)

To enable an internal combustion engine, especially an internal combustion engine for a military airplane, to respond satisfactorily to the demands made of it today its lubricating oil must be brought up to the optimum temperature promptly after the engine is started and kept from exceeding this temperature under any condition of operation of the engine.

To bring the oil promptly up to the optimum temperature, not to say to supply oil to the bearings of the engine, it is necessary to begin to circulate oil through the lubricating system of the engine as soon as the engine is started. To do this effectively when the oil is cold there must be a relatively unresistive path for the passage of oil from the tank or other storage reservoir to the bearings of the engine and from the bearings back to the storage reservoir.

To keep the lubricant of an engine from exceeding its optimum temperature oil coolers in which heat is extracted from the lubricant by atmospheric air or the engine cooling liquid are employed. Oil coolers, however, do not most effectively extract heat from oil unless the oil passages in their cores are quite small in at least one transverse dimension and are of such form as to cause the oil to change its direction of flow frequently as it travels through them. Oil passages of the dimensions and form required most effectively to extract the heat from the oil when it is hot inherently offer so much resistance to the passage of oil when it is cold that not enough, if any, oil can be circulated through them under these conditions without applying to the oil more pressure than the oil cooler can withstand.

Circulation of the oil through the relatively unresistive path until it reaches its optimum temperature followed by diversion of it to the oil passages in the core of the oil cooler is not a satisfactory procedure because oil cannot be passed through these passages until the oil congealed in them has been thawed out by which time the oil being circulated through the lubricating system of the engine may have reached an excessively high temperature. To obviate this condition the oil being circulated through the lubricating system of the engine is, after it is warmed but well before it reaches its optimum temperature, diverted through a passage which is disposed in heat exchanging relation to the oil passages in the core of the cooler with the result that by the time the oil reaches its optimum temperature the oil in the oil passages in the core is thawed out. So that heat will effectively be transferred from it to the oil in the oil passages in the core this passage is made of the same general character as the oil passages in the core but of larger minimum transverse dimension and/or less tortuous so that the oil congealed in it can without too much difficulty be forced out of it when pressure is applied to it.

This invention has to do with systems for regulating the temperature of the lubricating oil of internal combustion engines and resides in an improvement in valves for automatically directing the oil being circulated through the lubricating system of an internal combustion engine through a relatively unresistive path when it is cold, through a passage which is less resistive than and disposed in heat exchanging relation to the oil passages in the core when it is warm, and through the resistive oil passages in the core when it is hot. In this specification, the terms "cold," "warm" and "hot" are employed in a relative sense only and not to designate any specific temperatures or ranges of temperatures.

For a better understanding of the nature and objects of this invention reference is made to the following specification wherein there is described the preferred embodiment of the invention which is illustrated in the accompanying drawing.

Figure 2 is an enlarged section through the valve, taken on the line 2—2 of Figure 1, when the cylinder is in its cold position.

Figures 3 and 4 are sections through the valve, taken on the lines 3—3 and 4—4, respectively, of Figure 2, when the cylinder is in its cold position.

Figure 5:
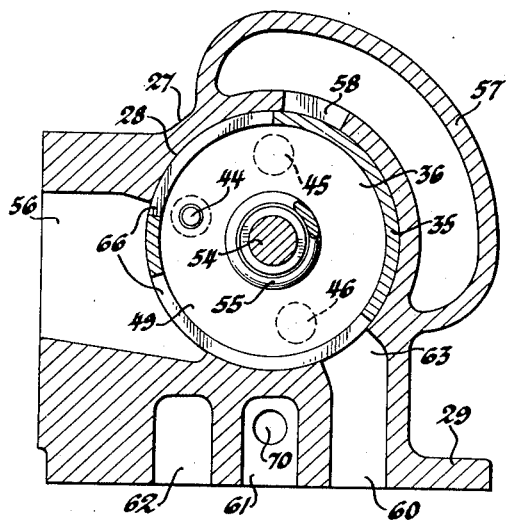
Figure 6:
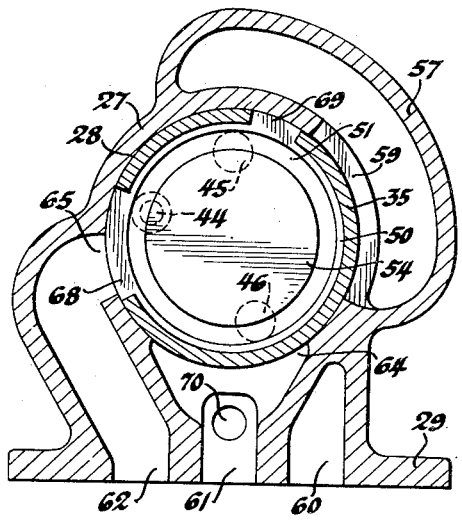

Figures 5 and 6 are sections through the valve, taken on the lines 3—3 and 4—4, respectively, of Figure 2, when the cylinder is in its warm position.

Figure 7:
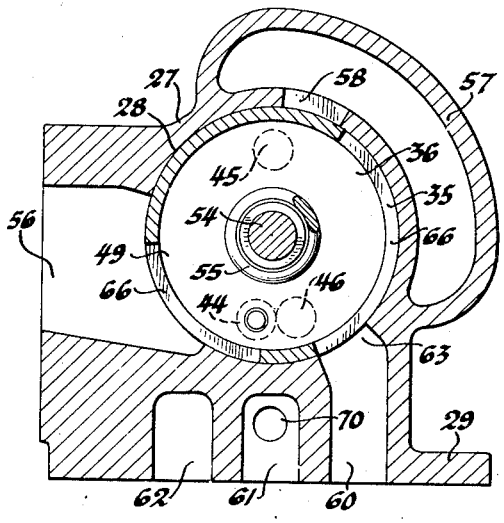
Figure 8:
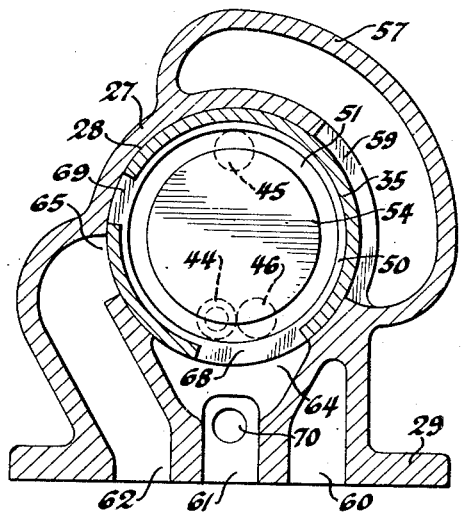

Figures 7 and 8 are sections through the valve, taken on the lines 3—3 and 4—4, respectively, of Figure 2, when the cylinder is in its hot position.

The oil cooler 10 which is shown in the drawing includes a core which consists of several sections 11 disposed within a double-walled cylindrical shell 12. Between the sections of the core there are disposed double-walled baffles 13 whose interspaces 14 open at each end into the space between the walls of the shell 12. Openings 15 in the baffles establish communication between the oil passages in the several sections 11 of the core.

To the outer wall of the shell 12 between the ends of one of the outside baffles 13 there is secured a mounting pad 16. A rib 17 on the underside of the mounting pad and a baffle 18 between the ends of the other of the outside baffles 13 bridge the space between the walls of the shell 13 and 12 and divide it into two compartments, 19 and 20, which do not intercommunicate except through the spaces 14 between the walls of the baffles 13. Through the pad 16 there extends an elongated opening 21 through which oil may enter the compartment 19 and an elongated opening 22 through which oil may leave the compartment 20. Through the inner wall of the shell 12 between the ends of the baffle 13 nearest the baffle 18 there extend openings 23 through which oil may pass from the compartment 19 into the oil passages in the core 11. Through the rib 17 on the mounting pad 16 there extends an elongated opening 25 through which oil may leave the oil passages in the core.

Oil which enters the cooler 10 through the opening 21 may leave it either through the opening 22 or the opening 25. The path from the opening 21 to the opening 25 is through the compartment 19, the openings 23, and the oil passages in the core and the openings 15 in the baffles 13 between the sections 11 of the core. The path from the opening 21 to the opening 22 is through the compartment 19, the spaces 14 between the walls of the baffles 13 and the compartment 20. The oil passages in the core are preferably of the dimensions and form required most effectively to extract heat from the oil. The spaces 14 between the walls of the baffles 13 are preferably of the same general character but of larger minimum transverse dimensions and/or less tortuous.

In the course of its passage through the oil passages in the core on its way from the opening 21 to the opening 25 the oil is, of course, cooled by the air which passes through the air passages in the core. In the course of its passage through the compartment 19, the spaces 14 between the walls of the baffles 13 and the compartment 20 on its way from the opening 21 to the opening 22 warm oil transfers heat to and thaws out oil congealed in the oil passages in the core.

The oil cooler which is illustrated in the drawing and described above is not our invention. Our invention resides in the valve 26 which is mounted on the pad 16.

The valve 26 includes an elongated body 27 through which extends a cylindrical bore 28 and a base 29 which is integral with the body. One end of the bore 28 is closed by a cap 30 between which and the body 27 is clamped a plate 31 which is held against rotation by a pin 32. Over the other end of the body there is secured an outlet fitting 33 between which and the body there is clamped a ring 34 which is held against rotation by a pin 47 which is secured in the body and may be entered into any one of a ring of notches 48 in the outer edge of the ring.

Within the bore 28 there is disposed a hollow cylinder 35 whose end nearest the cap 30 is closed by a head 36 and whose opposite end is open. The cylinder 35 is mounted on needle bearings 37 so that it can rotate freely in the bore. Endwise motion of the cylinder in the bore is prevented by a stepped shank bolt 38 which extends through the plate 31 and the head 36 of the cylinder and is secured to the latter by a nut 39. Washers 40 and ball bearings 41 between the heads of the bolt 38 and the cylinder 35 and the plate 31 minimize friction in the bearings between them.

To rotate the valve there is provided a bi-metal thermostat 42 which is anchored at one end to the ring 34 and at the other end to a hollow cylindrical coupling 43 which is telescoped within the nearest end of the cylinder 35 and keyed to it so that it cannot rotate with respect to it. Rotation of the cylinder 35 in one direction is limited by engagement of the head of a screw 44 which is threaded into the head 36 of the cylinder with a stop 45 riveted to the plate 31. Rotation of the cylinder in the opposite direction is limited by engagement of the head of the screw 44 with a stop 46 riveted to the plate 31 at such a distance circumferentially of the plate from the stop 45 that the rotation of the cylinder 35 is limited to about 135°. The initial stress in the thermostat 42 may be adjusted to any desired value by removing the outlet fitting 33, rotating the ring 34 and entering the pin 47 in the corresponding notch 48.

The interior of the cylinder 35 is divided lengthwise into an inlet chamber 49 and an outlet chamber 50 by a partition 51 with a large central opening in it. In the opening in the partition 51 there is threaded a valve seat 52 from which projects into the inlet chamber 49 an arm 53 with a bore in it through which extends the stem of a poppet valve 54 with its head located in the outlet chamber 50. A spring 55 urges the poppet valve 54 toward its closed position.

Into the bore 28 through the body 27 opposite the inlet chamber 49 in the cylinder 35 extends the inlet port 56 of the valve. On one side opposite the chambers 49 and 50 in the cylinder 35 there is provided on the wall of the body 27 an elongated "blister" 57 which opens into the bore 28 opposite the inlet chamber 49 through a by-pass port 58 and into the bore 28 opposite the outlet chamber 50 through a by-pass port 59. In the underside of the base 29 there are parallel elongated recesses 60, 61 and 62. The recess 60 opens into the bore 28 opposite the inlet chamber 49 through an intermediate outlet port 63 and the recesses 61 and 62 open into the bore 28 opposite the outlet chamber 50 through intermediate inlet ports 64 and 65.

Through the wall of the cylinder 35 opposite the inlet chamber 49 there extends a divided port 66 and through the wall of the cylinder opposite the outlet chamber 50 there extend ports 68 and 69.

The thermostat is so constructed and arranged and the ports 66, 68 and 69 in the cylinder 35 are of such dimensions and so disposed circumferentially of the cylinder that when the thermostat is cold it holds the head of the screw 44 against the stop 45 and, as Figures 3 and 4 show, when the cylinder 35 is in this position the port 66 registers with the inlet port 56 and the by-pass port 58 and the port 69 with the by-pass port 59 and all other lateral ports in the body 27 are closed by the wall of the cylinder; that as its temperature rises the thermostat rotates the cylinder in the direction to move the head of the screw 44 toward the stop 46; that when the thermostat is warm it positions the head of the screw 44 intermediate the stops 45 and 46 and, as Figures 5 and 6, show, when the cylinder is in this position the port 66 registers with the inlet port 56 and the intermediate outlet port 63 and the port 68 with the intermediate inlet port 65 and all other lateral ports in the body are closed by the wall of the cylinder; that when the thermostat is hot it holds the head of the screw 44 against the stop 46 and, as Figures 7 and 8 show, when the cylinder is in this position the port 66 registers with the inlet port 56 and the intermediate outlet port 63 and the port 68 with the intermediate inlet port 64 and all other lateral ports in the body are closed by the wall of the cylinder; that when the thermostat is between cold and warm the port 66 registers with the inlet port 56, the intermediate outlet port 63 and the by-pass port 58, the port 68 with the intermediate inlet port 65 and the port 69 with the by-pass port 59 and the intermediate inlet port 64 is the only lateral port in the body closed by the wall of the cylinder; and that when the thermostat is between warm and hot the port 66 registers with the inlet port 56 and the intermediate outlet port 63 and the port 68 with the intermediate inlet ports 64 and 65 and the by-pass ports 58 and 59 are the only lateral ports in the body closed by the wall of the cylinder.

Figure 1:
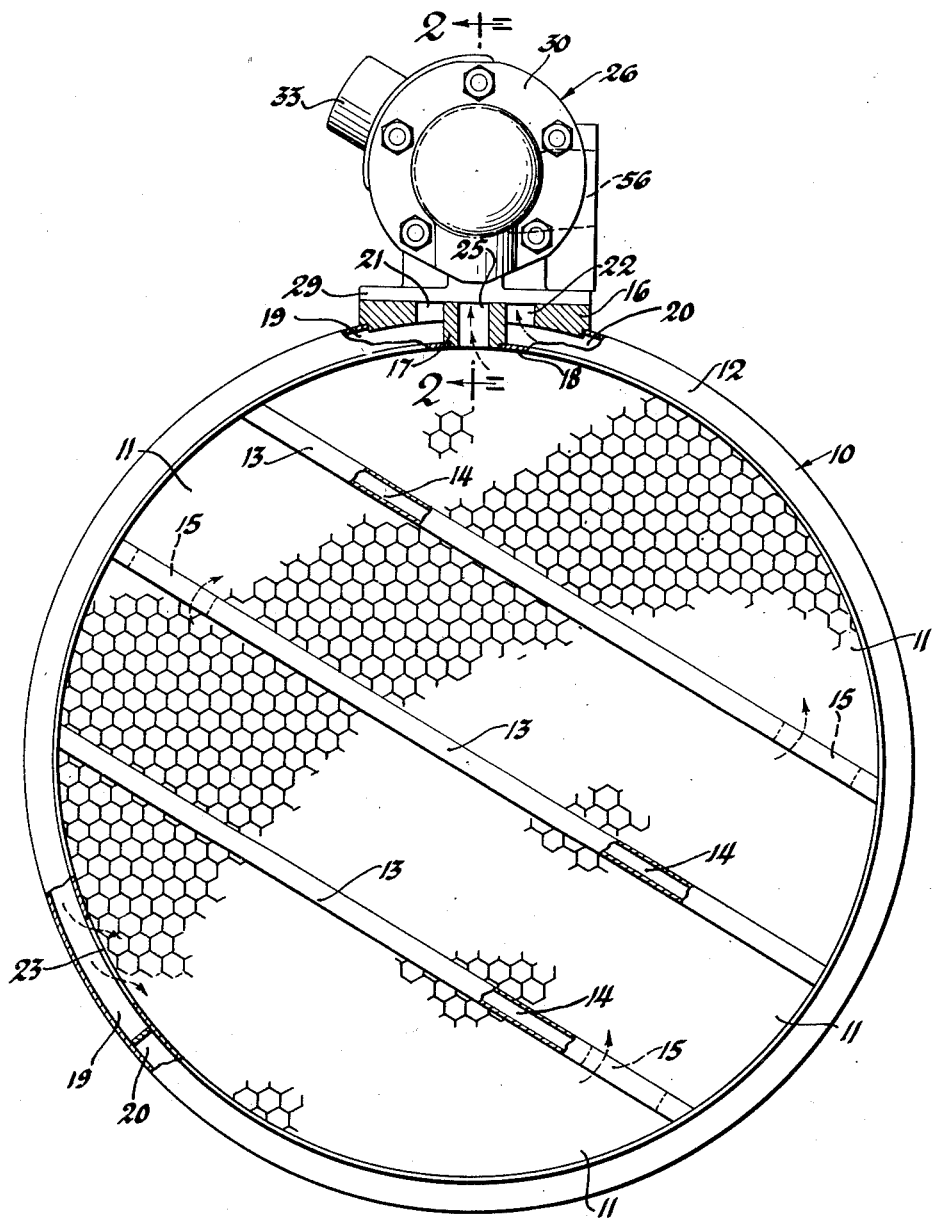
Figure 1 is an end elevation, with parts broken away and in section, of an oil cooler on which is mounted a valve in accordance with our invention.

The valve 26 was, as Figure 1 shows, designed to be mounted on the oil cooler 10 with its base 29 seated on the mounting pad 16 and the recesses 60, 61 and 62 in registration, respectively, with the openings 21, 25 and 22 in the mounting pad.

The oil cooler and valve assembly shown in Figure 1 was designed for installation in the lubricating system of an internal combustion engine between the scavenger pump and the oil tank or other oil storage reservoir with the discharge side of the pump connected to the inlet port 56 in the valve and the outlet fitting 33 of the valve connected to the pipe which leads to the oil storage reservoir. The assembly can, however, of course, be installed between the pressure pump and the bearings of an engine and is not limited to use with engines equipped with lubricating systems which have in them both pressure and scavenging pumps. The assembly or the valve alone, moreover, may be employed wherever a unit or a valve with its characteristics is needed.

Assuming, however, that the cooler and valve assembly is installed in the lubricating system of an internal combustion engine as first described and the engine is operating: When the oil which is forced by the pump into the inlet port 56 of the valve is cold and too thick to pass through the cooler and needs heating rather than cooling, the thermostat holds the cylinder 35 in its cold position and the oil, consequently, passes from the inlet chamber 49 directly to the outlet chamber 50, by way of the by-pass ports 58 and 59 and the "blister" 57, and, from the outlet chamber, over the thermostat to the outlet fitting. From the outlet fitting the oil, of course, passes to the oil storage reservoir and, thence, through the bearings of the engine back to the inlet 56. The heat extracted by the oil from the engine in the course of continued circulation in this path gradually raises the temperature of the oil. When the oil which passes over the thermostat is warm, the thermostat positions the cylinder in its warm position and the oil, consequently, passes from the inlet chamber to the outlet chamber, by way of the intermediate outlet port 63, the recess 60 in the base of the valve, the opening 21 in the mounting pad 16, the compartment 19, the passage 14 and the compartment 20 in the cooler, the opening 22 in the mounting pad, the recess 62 in the base of the valve and the intermediate inlet port 68, and, from the outlet chamber, over the thermostat, to the outlet fitting. Of course, the movement of the cylinder from its cold position to its warm position is gradual and when it is between these positions the oil passes from the inlet chamber to the outlet chamber partly by way of its cold path and partly by way of its warm path in gradually decreasing proportion through the former and in generally increasing proportion through the latter as the temperature rises. In the course of its travel through the compartment 19, the passages 14 and the compartment 20, the oil transfers heat to and gradually thaws out the oil congealed in the oil passages in the core 11. The heat extracted by the oil from the engine in the course of continued circulation in the warm path, however, exceeds that lost in the cooler and the temperature of the oil, consequently, continues to rise. By the time the oil which passes over the thermostat becomes hot the oil in the oil passages in the core will have been thawed out. When the oil which passes over the thermostat is hot, the thermostat positions the cylinder in its hot position and the oil, consequently, passes from the inlet chamber to the outlet chamber by way of the intermediate outlet port 63, the recess 60 in the base of the valve, the opening 21 in the mounting pad, the compartment 19, the openings 23, the oil passages in the core and the openings 15 through the baffles 13 in the cooler, the opening 25 in the mounting pad, the recess 61 in the base of the valve and the port 64, and from the outlet chamber, over the thermostat, to the outlet fitting. Of course, the movement of the cylinder from its warm position to its hot position is gradual and when it is between these positions the oil passes from the inlet chamber to the outlet chamber partly by way of its warm path and partly by way of its hot path in gradually decreasing proportion through the former and in gradually increasing proportion through the latter as the temperature rises. In the course of its travel through the oil passages in the core the oil is, of course, cooled by the air passing through the air passages in the core and thus prevented from exceeding its optimum temperature.

The oil cooler and valve assembly disclosed, therefore, provides for heating the oil in the lubricating system of an internal combustion engine to its optimum temperature as rapidly as possible and cooling the oil as soon as it reaches its optimum temperature in order to prevent it exceeding it at any time. The gradual shift of the oil from its cold to its warm and its warm to its hot paths has the beneficial effect that if the oil in the passages 14 between the walls of the baffles 13 or in the oil passages in the core 11 is too thick to be moved quickly as soon as the oil has access to the paths which include these passages the oil can continue to travel by the lower temperature path until the higher temperature path has been cleared as a result of the application of pressure of the circulating oil to the oil in it, thus reducing the likelihood of disruption of the cooler by the application of excessive pressure to it. This possibility is further guarded against by the provision of the poppet valve 54 which opens and permits oil to pass, through the central opening in the partition 51, directly from the inlet chamber 49 to the outlet chamber 50 and, thence, over the thermostat, to the outlet fitting if it encounters too much resistance to flow through its normal path at any temperature.

The passage 70 in the cap 30 and base 29 is provided to permit escape to the recess 61 in the base of any oil which leaks into the space between the cap and the plate 31.

We claim:

1. In a valve, a body with a cylindrical bore in it, a hollow cylinder mounted so that it can rotate within the bore, a transverse partition in the cylinder which subdivides the bore lengthwise into an inlet chamber and an outlet chamber, an inlet port in the body which opens laterally into the bore opposite the inlet chamber, an outlet port in the body which opens into the end of the outlet chamber, by-pass inlet and outlet ports in the body which open laterally into the bore opposite the inlet chamber and opposite the outlet chamber, respectively, an intermediate outlet port in the body which opens laterally into the bore opposite the inlet chamber, two intermediate inlet ports in the body which open laterally into the bore opposite the outlet chamber, a port in the cylinder which opens laterally into the inlet chamber and the bore and ports in the cylinder which open laterally into the outlet chamber and the bore so disposed that, when the cylinder is in one position, the first specified inlet port and the by-pass ports are open and the intermediate outlet port and the intermediate inlet ports are closed, when the cylinder is rotated in one direction from the mentioned position, the first specified inlet port, the intermediate outlet port and one of the intermediate inlet ports are open and the by-pass ports and the other intermediate inlet port are closed and, when the cylinder is rotated further in the mentioned direction, the first specified inlet port and the intermediate outlet port and the other only of the intermediate inlet ports are open and the by-pass ports are closed, a helical bimetal thermostat which is disposed within and lengthwise of the bore between the ports which open laterally into it and the outlet port and so constructed and arranged that when its temperature rises it rotates the cylinder in the mentioned direction, a port in the partition between the inlet chamber and the outlet chamber, and a valve member which normally closes the last specified port but moves to a position in which the port is open when the pressure in the inlet chamber exceeds that in the outlet chamber by a predetermined value.

2. In a valve, a body with a cylindrical bore in it, a hollow cylinder mounted so that it can rotate within the bore, a transverse wall in the cylinder which subdivides the bore lengthwise into one chamber and another chamber, a port in the body which opens into one of the chambers, a port in the body which opens into the other of the chambers, by-pass ports in the body of which one opens laterally into the bore opposite the first mentioned chamber and the other opens into the other chamber, two intermediate ports in the body which open laterally into the bore opposite the first mentioned chamber, an intermediate port in the body which opens into the other chamber, a port in the cylinder which opens laterally into the first mentioned chamber and the bore so disposed that, when the cylinder is in one position, the by-pass port which opens into the first mentioned chamber is open, when the cylinder is rotated in one direction from the mentioned position, one of the intermediate ports which open into the first mentioned chamber is open and, when the cylinder is rotated further in the mentioned direction, the other of the intermediate ports which open into the first mentioned chamber is open, and a thermostat which is disposed within the bore and so constructed and arranged that when its temperature rises it rotates the cylinder in the mentioned direction.

3. In a system of the type disclosed, a valve, which includes a body with a recess in it, a member so mounted that it can move within the recess, a wall in the member which subdivides the recess into an inlet chamber and an outlet chamber through which fluid passes successively in the course of its travel to its point of use, a port in the body through which fluid enters the inlet chamber, a port in the body through which fluid leaves the outlet chamber, ports in the body through which fluid may pass from the inlet chamber into the outlet chamber in the course of its travel to its point of use, means by which the member may be moved to regulate passage of fluid through the last specified ports, a port in the wall between the inlet chamber and the outlet chamber, and a member arranged so that it normally closes the last specified port but moves to a position in which the port is open so that fluid may pass therethrough from the inlet chamber to the outlet chamber when the pressure in the inlet chamber exceeds that in the outlet chamber by a predetermined value.

4. In a system of the type disclosed, a valve which includes a body with a recess in it, a member which includes a wall which subdivides the recess into an inlet chamber and an outlet chamber through which fluid passes successively in the course of its travel to its point of use so mounted that it can rotate within the recess in the body, a port in the body through which fluid enters the inlet chamber, a port in the body through which fluid leaves the outlet chamber, ports in the body through which fluid may pass from the inlet chamber into the outlet chamber in the course of its travel to its point of use, a thermostat which is disposed within the recess and connected to the member so that it may rotate it to and from a position in which a portion thereof prevents the passage of fluid from the inlet chamber to the outlet chamber through the second specified ports, a port in the wall between the inlet chamber and the outlet chamber, and a member which normally closes the last specified port but moves to a position in which the port is open so that fluid may pass therethrough from the inlet chamber to the outlet chamber when the pressure in the inlet chamber exceeds that in the outlet chamber by a predetermined value.

5. In a valve, a body which has in it a recess, a wall which subdivides the recess into an inlet chamber and an outlet chamber, a port through which fluid enters the inlet chamber, a port through which fluid leaves the outlet chamber, a member disposed in one of the chambers and mounted so that it can rotate within it, means which defines two paths by which fluid may pass from the inlet chamber to the outlet chamber including two ports which open into the side of the chamber in which the member is disposed and a port which opens into the other chamber, and means by which the member may be rotated to and from a position in which a portion thereof closes either and leaves open the other of the second specified ports, including a bimetal thermostat disposed within the outlet chamber between the ports through which fluid enters and leaves it.

6. In a system of the type disclosed, a valve which includes a body with a cylindrical bore in it, a hollow cylinder mounted so that it can rotate within the bore, a transverse wall in the member which divides the bore into an inlet chamber and an outlet chamber through which fluid passes successively in the course of its travel to its point of use, a port in the body through which fluid enters the inlet chamber, a port in the body through which fluid leaves the outlet chamber, ports in the body through which fluid may pass from the inlet chamber into the outlet chamber in the course of its travel to its point of use, means by which the member may be rotated to regulate passage of fluid through the last specified ports, a port in the transverse wall between the inlet chamber and the outlet chamber, and a member arranged so that it normally closes the last specified port but moves to a position in which the port is open so that fluid may pass therethrough from the inlet chamber to the outlet chamber when the pressure in the inlet chamber exceeds that in the outlet chamber by a predetermined value.

7. In a valve, a body with a cylindrical bore in it, a hollow cylinder mounted so that it can rotate within the bore, a transverse partition in the cylinder which subdivides the bore lengthwise into an inlet chamber and an outlet chamber, an inlet port in the body which opens into the inlet chamber, an outlet port in the body which opens into the outlet chamber, two intermediate outlet ports in the body in the same zone which open laterally into the bore opposite the inlet chamber, two intermediate inlet ports in the body in the same zone which open laterally into the bore opposite the outlet chamber, and means by which the hollow cylinder may be rotated to regulate the flow of fluid through the intermediate outlet and the intermediate inlet ports.

8. In a valve, a body which has a cylindrical bore in it, a wall which divides the recess into an inlet chamber and an outlet chamber, a port through which fluid enters the inlet chamber, a port through which fluid leaves the outlet chamber, a member disposed in the bore and mounted so that it can rotate within it, means which defines two paths by which fluid may pass from the inlet chamber to the outlet chamber including two ports which open into the side of one of the chambers and two ports which open into the side of the other chamber, and means by which the member may be rotated to and from a position in which a portion thereof closes either and leaves open the other of the second and third specified ports, including a bimetal thermostat disposed within the outlet chamber between the ports through which fluid enters and leaves it.

LEO B. NEMMER.
CHARLES J. O'BRIEN.

References Cited in the file of this patent

UNITED STATES PATENTS

| Number | Name | Date |
|---|---|---|
| 1,412,845 | Dean | Apr. 18, 1922 |
| 1,414,780 | Giesler | May 2, 1922 |
| 1,858,454 | Lund | May 17, 1932 |
| 1,864,052 | Dykeman | June 21, 1932 |
| 1,909,755 | Cederstrom | May 16, 1933 |
| 1,916,325 | McAdams | July 4, 1933 |
| 1,989,598 | Kline | Jan. 29, 1935 |
| 1,992,796 | Young | Feb. 26, 1935 |
| 2,129,231 | Parker | Sept. 6, 1938 |
| 2,177,937 | Goldschmidt | Oct. 31, 1939 |
| 2,189,814 | McNeal | Feb. 13, 1940 |
| 2,222,907 | King | Nov. 26, 1940 |
| 2,244,808 | Scott | June 10, 1941 |

FOREIGN PATENTS

| Number | Country | Date |
|---|---|---|
| 18,825 | Great Britain | 1911 |
| 350,065 | Italy | July 5, 1937 |
| 621,750 | France | Feb. 12, 1927 |

OTHER REFERENCES

Sarco Catalog sheet, 2 pages entitled "Sarco Water Blender." A. I. A. file 29-D21, Sarco No. 140, published June 1936 by the Sarco Company, Incorporated, 188 Madison Avenue, New York city.